United States Patent
Ito

(10) Patent No.: US 6,684,904 B2
(45) Date of Patent: *Feb. 3, 2004

(54) VARIABLE PRESSURE VALVE APPARATUS

(75) Inventor: Takashi Ito, Chiba (JP)

(73) Assignee: Seiko Instruments Inc., Chiba (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/236,390

(22) Filed: Sep. 6, 2002

(65) Prior Publication Data

US 2003/0010949 A1 Jan. 16, 2003

Related U.S. Application Data

(62) Division of application No. 09/592,723, filed on Jun. 13, 2000, now Pat. No. 6,474,360.

(30) Foreign Application Priority Data

Jun. 15, 1999 (JP) .......................................... 11-168909

(51) Int. Cl.[7] .................................................. A61M 5/00
(52) U.S. Cl. .................... 137/530; 251/11; 251/129.06; 251/230; 604/9
(58) Field of Search ............................. 251/11, 129.06, 251/230; 137/530, 531; 604/9, 891.1

(56) References Cited

U.S. PATENT DOCUMENTS

| | | | | |
|---|---|---|---|---|
| 2,735,669 A | * | 2/1956 | Seiler ..................... | 137/530 X |
| 4,360,007 A | * | 11/1982 | Levy et al. ............. | 251/230 X |
| 4,559,037 A | * | 12/1985 | Franetzki et al. .... | 604/891.1 X |
| 4,595,390 A | * | 6/1986 | Hakim et al. .................. | 604/9 |
| 4,615,691 A | * | 10/1986 | Hakim et al. .................. | 604/9 |
| 4,772,257 A | * | 9/1988 | Hakim et al. .................. | 604/9 |
| 4,871,939 A | * | 10/1989 | Clouser ..................... | 310/332 |
| 5,643,194 A | * | 7/1997 | Negre ....................... | 604/9 X |
| 5,709,802 A | * | 1/1998 | Furuhata et al. ............... | 216/2 |
| 5,928,182 A | * | 7/1999 | Kraus et al. .................... | 604/9 |
| 6,050,969 A | * | 4/2000 | Kraus ............................. | 604/9 |
| 6,474,360 B1 | * | 11/2002 | Ito ............................. | 137/530 |

* cited by examiner

Primary Examiner—Gene Mancene
Assistant Examiner—Eric Keasel
(74) Attorney, Agent, or Firm—Adams & Wilks

(57) ABSTRACT

A valve can varied in operating pressure and stopped in opening and closing by an efficiently movable actuator due to feeding of electric power without malfunction due to disturbance of magnetism, impact or temperature. A variable pressure valve is provided with a shape memory alloy spring. The shape memory alloy spring is raised in temperature and varied in length by a secondary coil that is electromagnetically given power from a primary coil of a control probe. When the shape memory alloy spring varies in length, a feed ratchet performs linear movement to rotate a cam wheel. The cam wheel has a cam with which an urge spring and a rectifying lever at its one end is engaged. The urge spring and rectifying lever at their other ends engage a ball valve to vary an urge force on the ball valve due to rotation of the cam wheel.

20 Claims, 3 Drawing Sheets

VARIABLE PRESSURE VALVE APPARATUS

This application is a division of Ser. No. 09/592,723 filed Jun. 13, 2000 now U.S. Pat. No. 6,474,360.

BACKGROUND OF THE INVENTION

1. Field of the Invention

The present invention relates to a variable pressure valve apparatus structured separately with a control probe and a variable pressure valve to feed electric power from the control probe to the variable pressure valve in an electromagnetic way so that the valve is varied in opening and closing by an actuator operated on the fed power.

2. Background Information

The conventional variable pressure valve apparatus uses a magnetic actuator magnetically driven to vary the pressure of valve opening and closing. The magnetic actuator has a multi-pole rotor having at least one magnet fixed integrally on the rotation shaft, and arranged in a main body of the variable pressure valve. Meanwhile, the rotation shaft of the multi-pole rotor has an integral cam engaging a leaf spring. The leaf spring has the other end engaging an opening and closing valve in a ball form. When the rotor rotates, the leaf spring deflects following the cam to have a varied amount of deflection. This varies the application pressure onto the ball valve engaging the other end. The multi-pole rotor is usually submerged in a liquid flowing through the valve. Also, the multi-pole rotor is rotated due to a magnetic force generated from a probe separated from the variable pressure valve. The probe has at least two or more electromagnets. These electromagnets are equidistant from and positioned nearby the rotation shaft of the variable pressure valve. Rotation is given on a same principle as that of the usual step motor. If a pulse current different in phase is given to the electromagnets to sequentially energize them, the multi-pole rotor is given a rotation force due to a magnetic force from the electromagnets. Thus, the multi-pole rotor is rotated stepwise. (See, e.g. Japanese Patent Laid-open No. 40063/1985).

The conventional variable pressure valve apparatus however uses a magnetic actuator to be driven due to a magnetic force. When conducting photographic diagnosis with an MRI (magnetic resonance imager apparatus), the variable pressure valve apparatus is affected by a magnetic force generated by the apparatus and is therefore, subjected to the occurrence of malfunction. Furthermore, the multi-pole rotor of the magnetic actuator is held by a weak force of the leaf spring engaging the multi-pole rotor. Accordingly, if the variable pressure valve suffers an impact, the leaf spring goes out of contact or is weakened resulting in a problem of causing rotation of the rotor. Additionally, because the magnetic actuator is entirely exposed to a liquid passing the valve, there are cases of deposition of ingredients of the fluid in a long term. In particular, where the actuator at its bearing part is in a fluid, there is a problem that rotor rotation is badly affected. Furthermore, because of an absence of a mechanism for stopping the valve from opening, the valve cannot be stopped from actuating even if its operation is unnecessary. In order to prevent the valve from actuating, the valve must be urged by such a force that the valve cannot be moved by fluid pressure. However, there has been a problem that the variable pressure valve apparatus has increased in size with increased power consumption. Because of the absence of a positioning mechanism for efficiently providing a magnetic force of the probe to the rotor, a magnetic force if given to the rotor will not supply sufficient electric power to the rotor, resulting in a problem that the rotor might not rotate normally.

SUMMARY OF THE INVENTION

The present invention is provided with position detecting means to efficiently supply electric power without contact, a non-magnetic actuator free from malfunction due to a magnetic force, impact disturbance or deposition of ingredients of a flowing fluid, and a means to disable as required an opening and closing function of a valve and operable with fidelity under an external probe.

In order to avoid an affection of an external magnetic force, an actuator is utilized which has as a drive source a shape memory alloy or piezoelectric element to non-magnetically drive pressure varying means. It was taken in and supply a non-contact power feed system due to an electromagnetic coil utilizing electromagnetic coupling power as required power to operate the non-magnetic actuator. In order to avoid poor operation due to deposition of fluid ingredients on the non-magnetic actuator and short circuit during power feed, an isolation structure is adopted that isolates between a fluid flowing through the variable pressure valve and the actuator and electromagnetic coil. Furthermore, provided are a rectifying lever to forcibly stop valve opening and closing, and a mechanism for enhancing a stationary force by engaging a cam varying spring deflection with a positioning spring so as not to vary the deflection of the spring urging the valve due to impact. An electric power feed system is provided with a primary coil to maximize efficiency on a probe side and a position detecting function to detect a position of a secondary coil on a pressure varying valve side.

In the case that a shape memory alloy is used for the actuator, the shape memory alloy is reduced in size as small as possible for immediate heat conduction, in order to improve the lower in operation speed upon discharge. It is also possible to forcibly accelerate heat exchange due to heating and cooling by contacting the thermoelectric element with the shape memory alloy. This can increase the speed of operation of the shape memory alloy. In order to avoid malfunction of the shape memory alloy due to affection of environmental temperature, the deformation temperature of the shape memory alloy is set higher than an environmental temperature to be assumably exposed routinely. Where heating and cooling by a thermoelectric element, the shape memory alloy can be set to cool and actuate. Thus, the set range of operation temperature broadens, providing a merit of increasing the width of selection.

DETAILED DESCRIPTION OF THE PREFERRED EMBODIMENT

Figure 1:
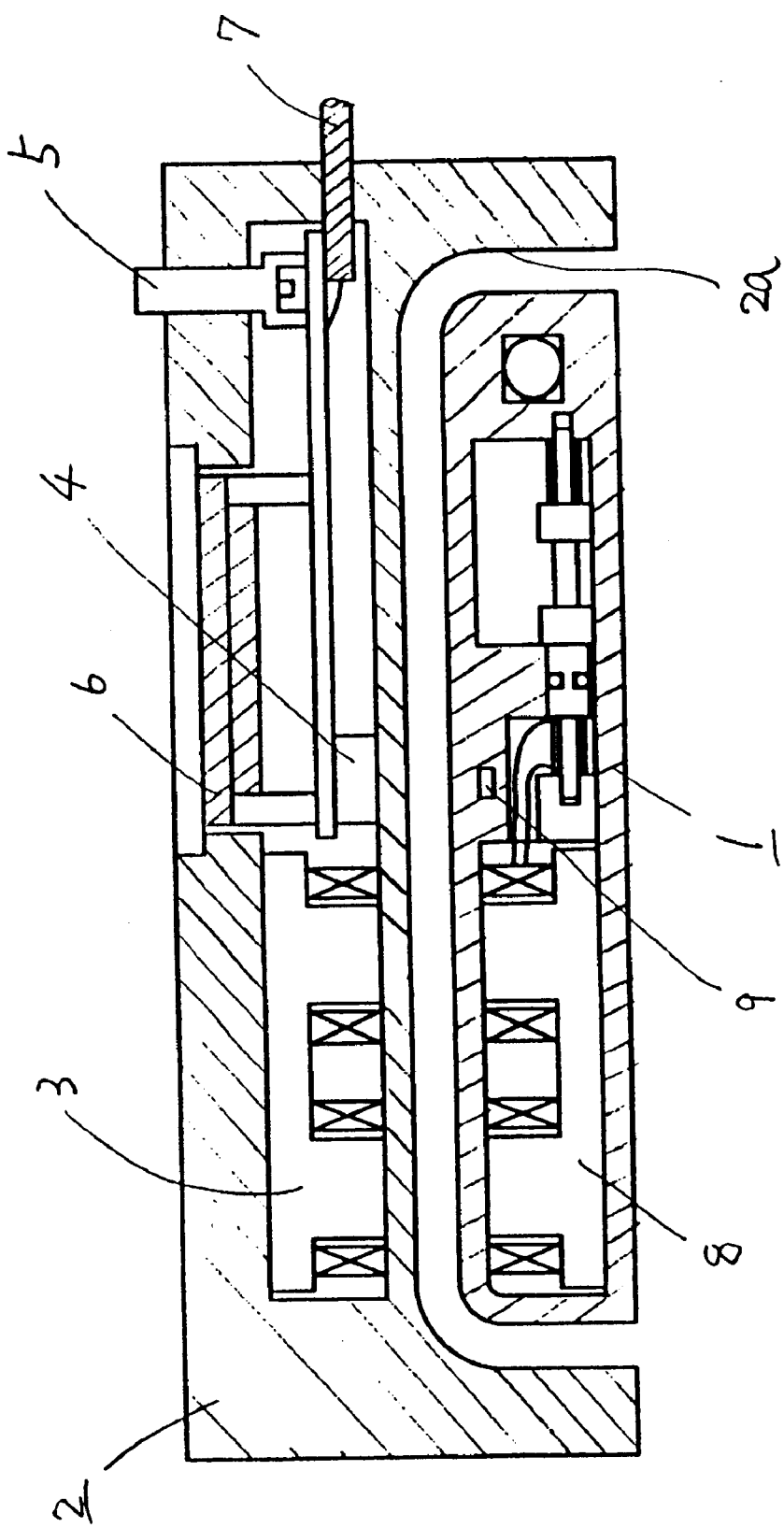
FIG. 1 is a longitudinal sectional view showing an embodiment of a variable pressure valve apparatus.

A variable pressure valve apparatus of the present invention is structured by a variable pressure valve having an actuator using an electric power to vary an operating pressure onto a valve, and a control probe to supply power to the variable pressure valve and control operation of the variable pressure valve.

Each of the variable pressure valve and the control probe has at least one electromagnetic coil. The electromagnetic coupling operation of the electromagnetic coils enables to feed electric power without requiring direct electrical contact.

The electromagnetic coil on a variable pressure valve side requires an enough volume to supply power consumption by the actuator. Also, in the electromagnetic coil the use of a magnetic core formed of a soft magnetic material prevents leak of magnetic flux and hence improves efficiency.

The magnetic core is not limited to metal. For example, preferred in respect of reduced weight is a molded product of a soft magnetic material powder bound with a plastic binder. The coil may be in a form with a coil wire directly wound on a core or with a coil wire wound on a plate-formed core. The core may use any number of layers of lamination. In order to provide magnetic coupling, the respective coils or cores on the variable pressure valve and control probe sides are arranged in an opposed relation with a required minimal air gap so as to form a loop magnetic flux path. When a primary coil on the control probe side is energized with an alternating current, an induced electromotive force is generated on a secondary coil on the variable pressure valve side. This in turn provides energization to the actuator from the secondary coil. The coils on the both sides may be wrapped with a insulation material as required, because of a possibility of generating heat on the coils due to a flowing current.

The control probe is buried with the primary coil. The control probe further mounts thereon a switch to control energization, a sensor and detecting circuit to detect a positional relationship between the coil, and a display device to display a result. The control probe is in a shape having a part covering the entire of the secondary coil or variable pressure valve.

The variable pressure valve has, besides the secondary coil, a ball valve formed of a material of gemstone in a spherical form, and a urge spring formed of a corrosion-resistant material to urge the ball onto a valve seat contacting the ball valve and opening and closing for fluid flow. The urge spring has the other end engaging a cam wheel to deflect the urge spring.

The cam wheel is structure integral with three cams. A first cam engages a jumper spring to position and hold the entire cam wheel. The jumper spring has one end having a regulation surface formed by mountain-formed two surfaces contacting with and held by two teeth of the first cam so that the cam can be positioned by a spring force. The other end of the jumper spring is fixed on the case or base. A second cam serves to move a regulation lever to eliminate the opening and closing function of the ball valve. The regulation lever has one end engaging the second cam. The second cam when contacts at its summit with the regulation lever rotates about an rotation center as an axis. The other end of the regulation lever contacts the ball valve to act to close the ball valve. A third cam contacts one end of the urge spring. The urge spring at the other end contacts the ball valve. The urge spring has a fulcrum so that, if the third cam rotates to vary the deflection of the urge spring flowing an outer shape thereof, the urge spring rotates about the fulcrum as an axis. The urge spring at the other end contacts the ball valve so that the opening and closing pressure of the ball valve can be controlled by varying the pressure exerted to the ball valve.

The actuator for rotating the cam wheel and varying the urge pressure onto the ball valve is supplied with power from the secondary coil.

For example, the use of an actuator utilizing a shape memory alloy spring or using a piezoelectric element prevents affection of an external magnetic force.

The actuator using a shape memory alloy is structured at least by a spring using a shape memory alloy as a material, a return spring for providing an initial deformation to the shape memory alloy spring and acting to restore the shape memory alloy to a pre-heating shape when cooled after heating and deforming the shape memory alloy, and a feed ratchet in a shaft form supported at axis by a case or other support member. The feed ratchet supports at axis the shape memory alloy spring and the return spring, and has a large diameter part positioned between the shape memory alloy spring and the return spring and engaging the first cam of the cam wheel to drive the cam wheel. The shape memory alloy spring is feasible in various forms, such as a straight or curved line of a wire, a coiled spring and a leaf spring. It can be considered that the shape of the feed ratchet be in a different combination due to a shape of the shape memory alloy spring, also, the shape memory alloy requires a sufficient size for causing a deformation amount and force to rotate the cam wheel when it is applied with heat. It is preferred to make as small as possible and devise for promptly conduct heat. The shape memory alloy has an operation beginning temperature to begin deformation that is higher than a solidification temperature of fluid but lower than an evaporation temperature. This prevent malfunction due to an effect of temperature. Also, where the variable pressure valve is used in a human body, it is preferably used at a temperature higher than a temperature near a body heat. It is also necessary to set with an allowance for an environmental temperature in normal use.

The shape memory alloy uses means to naturally cool down and restore a shape after heated by energization or heating resistance. Furthermore, high speed operation is feasible by contacting a thermoelectric element with the shape memory alloy spring and energizing the thermoelectric element to utilize forcible rapid heating or cooling. As described before, there is a necessity to set an operation beginning temperature of the shape memory alloy at a temperature higher than an environmental temperature at which exposure be considered during use. However, the use of a thermoelectric element enables setting at a lower temperature thus broadening a range of setting. It can be considered for the return spring to use a dish spring or a leaf spring in a U-form besides the coiled spring, similarly to the shape memory alloy spring. It is possible to combine with the shape memory alloy in various ways. Where the shape memory alloy is set to be compressed and deformed through heating, the return spring is set to act in a direction of pulling and extending the shape memory alloy into a former shape. The return spring is set such that its spring force is smaller than a force caused upon heated and deformed but capable of returning the shape memory ally to its former shape when the shape memory alloy no longer causes a deformation force at an end of heating. Conversely, where the shape memory alloy is set to expand upon heated, the return spring is provided with a characteristic to cause a spring force in a direction of compressing the shape memory alloy and returning the deformation of the shape memory alloy to a former shape. The return spring can also use a shape memory alloy to make the both in a congruence form. The both can be used set to compress or expand each other such that they are alternately energized to expand or compress each other. The feed ratchet may be contemplated as a type that is in a shaft form to move linear or a type having a rotation center to rotate.

The operation is now explained. The shape memory alloy spring causes contraction and expansion by energized and heated, to generate a force overcoming a force of the return spring of the feed ratchet being engaged. This force cause the feed ratchet to slide. The slid feed ratchet contacts the first cam of the cam wheel to rotate the cam wheel. The moving amount of the sliding feed ratchet due to deformation of the shape memory alloy is determined about a half pitch of the first cam. When the first cam rotates about a half pitch, a tooth tip of the cam gets over a tip of a regulation surface of a jumper spring simultaneously engaged with the first cam. Thereupon, the cam wheel is rotated in a same direction by a spring force of the jumper spring. As a result, the cam rotates by one pitch. The shape memory alloy is cut off energization at a point where the feed ratchet abuts against an abutment for slide restriction. When the energization is shut down, the shape memory alloy begins to cool by radiating heat and is returned to a former shape by a force of the return spring. This causes also the feed ratchet to slide in a reverse direction back to a formed position. In this manner, the repetition of a series of movements provides reciprocal motion.

Meanwhile, where the opening and closing function of the ball valve becomes unnecessary during use of the variable pressure valve, if the cam wheel is rotated, it contacts a second cam of the cam wheel. The regulation lever rotatably supported at axis on the fulcrum is structured integral with a lever part that engages the ball valve and prevents its opening and closing. This forcibly eliminates the opening and closing function from the ball valve.

In the case of providing as a drive source an actuator using a piezoelectric element, preferred is for example a ultrasonic motor to be driven by the piezoelectric element. The ultrasonic motor has a piezoelectric element on a backside, and comprises on the other surface a ultrasonic stator having a comb form and a pinion gear structured integral with a ultrasonic rotor in contact with the ultrasonic stator for rotation. The pinion gear is in mesh with a gear train to transmit rotation of the ultrasonic motor with reduction of rotation. The gear train is in mesh with a rack gear provided part of the feed ratchet to convert rotation into reciprocal linear movement. The cam wheel is actuated by reciprocally driving the feed ratchet, similarly to the actuator using a shape memory alloy. It is possible even for an actuator using a lamination type or bimorph type piezoelectric element to drive the cam wheel through use of means for displacement amplification.

Explaining an embodiment with reference to the drawings, in FIG. 1 a variable pressure valve 1 and a control probe 2 are made in a separated form. The control probe 2 has a guide part 2a formed in part of an outer surface to guide the variable pressure valve 1. The guide part 2a is preferably in a shape analogous or similar to an outer shape of the variable pressure valve 1 so that it guides the variable pressure valve 1. Within the control probe 2 are arranged a primary coil 3 for power feed to the variable pressure valve 1 and at least one magnetic sensor 4 for detecting accurate positioning. In a surface are arranged an operating switch 5 and a display element 6. A power feed cable 7 is connected to an external power supply part (not shown) to feed power to the control probe 2.

Figure 2:
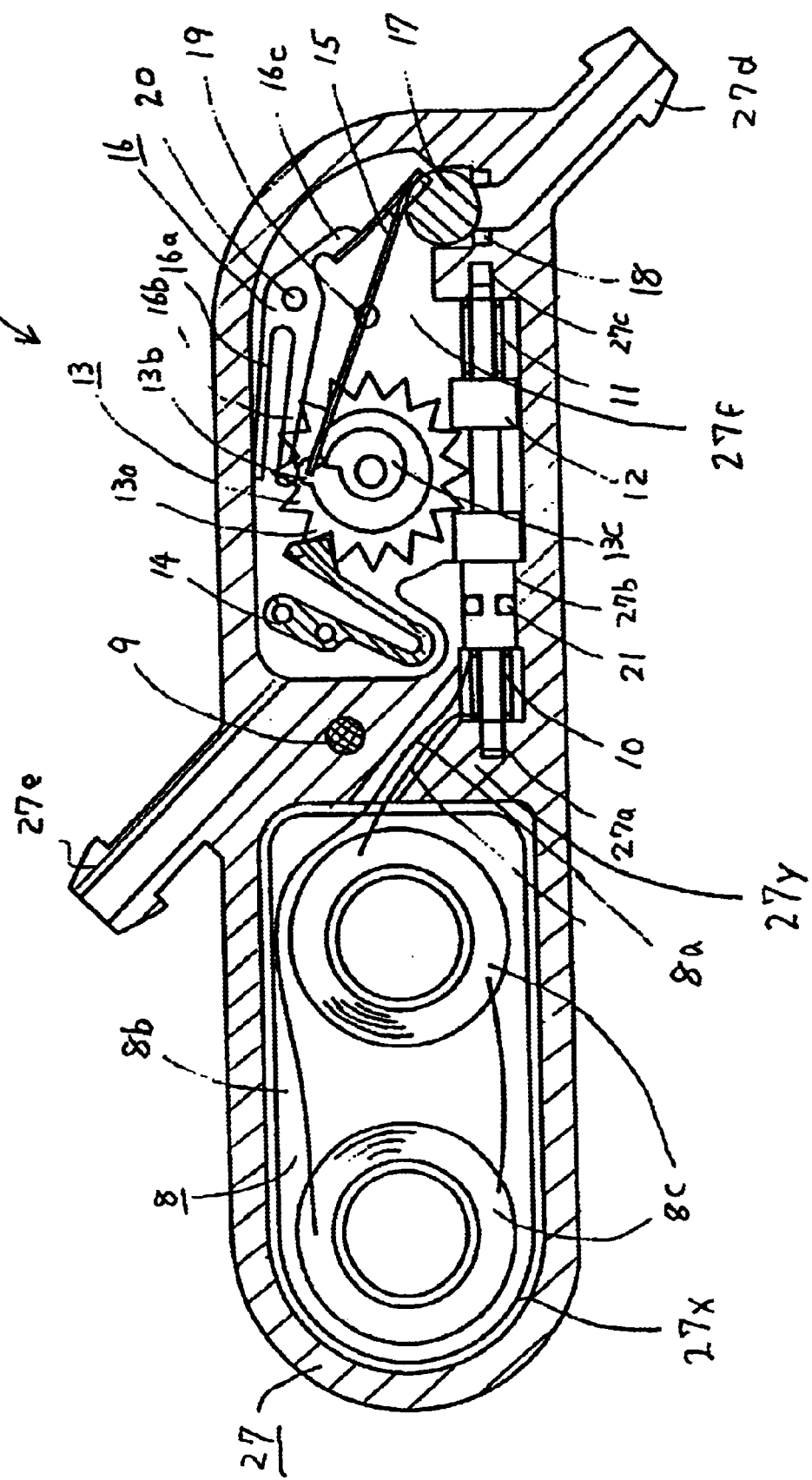
FIG. 2 is a sectional view in a horizontal direction showing an embodiment of a variable pressure valve with an actuator using a shape memory alloy.

FIG. 2 shows a horizontal sectional view illustrating an embodiment of the variable pressure valve having an actuator using a shape memory alloy. In FIG. 2 the variable pressure valve 1 has a power feed secondary coil 8 and a position detecting magnet 9. The control probe 2 has the primary coil 3 and the magnetic sensor 4 as shown in FIG. 1. The primary coil 3 and the secondary coil 8 are disposed opposite to and confront each other to form a closed flux path through their cores. Because of the shape of the control probe 2 has a certain clearance to an outer shape of the variable pressure valve 1, there is an actual possibility of causing deviation. In order to correct a deviation and position them in a direct opposition, the magnet 9 is arranged on the variable pressure side and the magnetic sensor 4 is arranged on the control probe 2 side. This enables position detection. The magnet 9 and the magnetic sensor 4 are arranged such that a flux center of the magnet 9 passes a sensor center of the magnetic sensor 4 when the primary coil 3 and the secondary coil 8 are positioned directly opposed in vertical section and plan.

Meanwhile, the variable pressure valve 1 mounts a shape memory alloy actuator structured by the secondary coil 8, a shape memory alloy spring 10, a return spring 11 and a feed ratchet 12. The secondary coil 8 has serially-connected two coils 8c bonded and mounted onto a core 8b. A power feed wire 8a wound around the coil 8c is soldered or welded to the shape memory alloy spring 10 formed of a shape memory alloy. The shape memory alloy spring 10 usually is used in compression. The return spring 11 is of a coil form. The feed ratchet 12 is in a shaft form to guide the shape memory alloy spring 10 and return spring 11 and constitutes movable means supported by bearing parts 27a, 27b and 27c, provided in a case 27, for undergoing movement. The secondary coil 8 is electromagnetically fed with power from the primary coil 3 of the control probe 2 and supplies power to the shape memory alloy spring 10. Due to this, the shape memory alloy spring 10 generates heat by its own electric resistance. This temperature change causes deformation in the shape memory alloy spring 10 and expands or extends the shape memory alloy spring 10 to press an end face of a large diameter part of the feed ratchet 12 toward the return spring 11. Because the return spring 11 is compressed, the feed ratchet 12 slides toward the return spring 11. Thus the shape memory alloy spring 10 constitutes moving means for undergoing extension movement to slide the feed ratchet 12. If the operation switch 5 of the control probe 2 is operated to cease power feed to the primary coil 3, no power is fed to the secondary coil 8, ceasing power feed to the shape memory alloy spring 10. When the shape memory alloy spring 10 is naturally cooled, the compressed return spring 11 returns to a former shape due to a restore force of the return spring 11. As a result, the feed ratchet 12 now slides in a reverse direction to perform reciprocal movement. A cam wheel 13 engaging the large diameter part of the feed ratchet at a tip of a first cam (hereinafter referred to as "star cam") 13a formed on the cam wheel 13 is fed by about a half pitch by sliding of the feed ratchet 12. Getting over a summit of a jumper spring 14 simultaneously engaging the star cam 13a, the cam wheel 13 now rotates clockwise by one pitch by a force of the jumper spring 14. Now, the jumper spring at its regulation surface is caught by a second tooth of the star cam to stop the rotation of the cam wheel. In this manner, the reciprocal motion of the feed ratchet 12 due to the shape memory alloy actuator is converted into intermittent rotational motion of the cam wheel 13. The intermittent rotation of the cam wheel 13 actuates a rectifying lever 16 engaging a second cam 13b of the cam wheel 13 and a spring member or an urge spring 15 engaging a third cam 13c. The urge spring 15 is in a leaf spring form and has a fulcrum 19 between its opposite ends. The fulcrum 19 is formed by a rotation shaft fixed with the leaf-formed urge spring 15. The rotation shaft is rotatably held by the case 27. The urge spring 15 has one end in engagement with the cam 13c of the cam wheel 13, and deforms following the cam 13c upon rotation of the cam wheel 13. Thus the cam wheel 13 constitutes rotation means for undergoing rotation to deform the spring member 15. This deformation causes the urge spring 15 to rotate about the fulcrum 19 to thereby vary an urge force at the other end of the urge spring 15 against valve element or ball valve 17. The ball valve 17 is press-contacted with a valve seat 18 buried and fixed in the case 27 by a force of the urge spring 15, which is located close to a fluid inlet port 27d. In the case fluid pressure surpasses a urge force of the ball valve 17, the urge spring 15 contacting the ball valve 17 is deformed by the pressure urging on the ball valve 17. The ball valve 17 leaves the valve seat 18 to allow fluid to enter inside the case 27 and flow out through an discharge port 27e. The rectifying lever 16 integrally has a return spring part 16a, a cam lever part 16b and a rectifying lever part 16c. The return spring part 16a rotatably held on the fulcrum 20 has an end contacting the case 27 and urges the cam lever part 16b onto the cam 13b. When the cam lever part 16b is rotated about the fulcrum 20 following the cam 13b by rotation of the cam wheel 13, the regulating lever part 16c holds down the ball valve 17 at a maximum lift of the cam 13b and disables opening/closing of the same. Between the secondary coil 8 and the shape memory alloy spring 10 is provided a partition wall 27d structured integral with the surrounding case 27. The partition wall 27d separates the variable pressure valve 1 into a first compartment 27x containing the secondary coil 8 and a second compartment 27f containing the feed ratchet 12, the cam wheel 13, the jumper wheel 14, the urge spring 15, the rectifying lever 16 and the ball valve 17. The partition wall 27d constitutes means for preventing the secondary coil 8 and shape memory alloy spring 10 from being exposed to fluid flowing through the ball valve 17 (e.g., flowing from the fluid inlet port 27d to the fluid discharge port 27e). A packing 21 is provided on the feed ratchet 12 sustained through and by the partition wall to prevent inflow of fluid from the bearing part. This structure prevents against deposition of ingredients of fluid and electric short circuit.

Alternatively, in place of energization to the shape memory alloy an electrothermal element may be contacted with at least one end of the shape memory alloy spring 10. The supply of rectified current to the electrothermal element from the secondary coil 8 enables forcible heating and cooling due to electrothermal effects. This makes possible to speed up the action in the shape memory alloy spring or set lower the deformation beginning temperature of the shape memory alloy spring.

Figure 3:
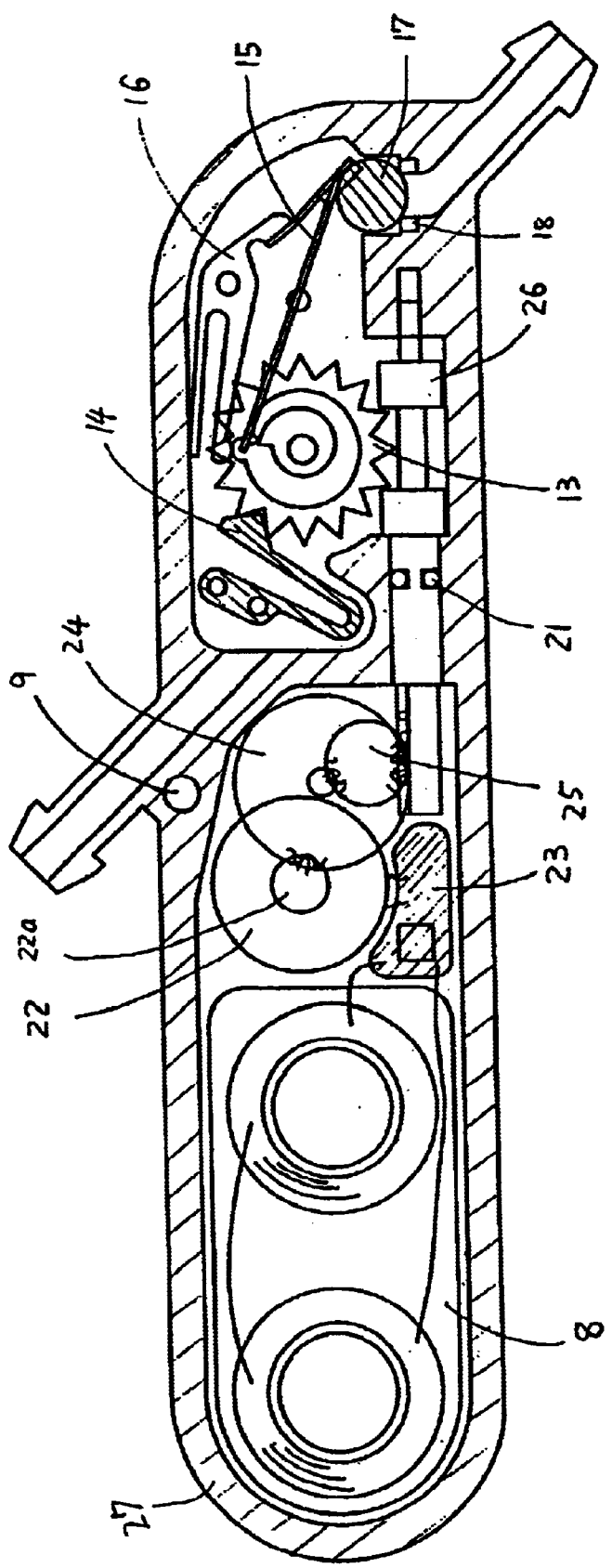
FIG. 3 is a sectional view in a horizontal direction showing an embodiment of a variable pressure valve with an actuator using a ultrasonic motor.

FIG. 3 shows an embodiment utilizing an ultrasonic motor using a piezoelectric element for an actuator thereof.

The ultrasonic motor 22 has a disc-formed piezoelectric element bonded on a backside thereof, a ultrasonic stator arranged annular on a surface and having a comb shape, and a rotor press-contacted with the surface of the stator and coaxially rotatable to the stator. The electric power supplied from the secondary coil 8 is fed to the drive circuit 23 of the ultrasonic motor 22. The drive circuit 23 has an output supplied to the piezoelectric element thereby driving the ultrasonic motor. The ultrasonic rotor is structured with a gear 22a meshing with a rack cut on a feed ratchet 26 through a wheel train 24, 25 thus reciprocating the feed ratchet 26. The feed ratchet 26 drives a cam wheel 13 to intermittently rotate to vary the deflection of an urge spring 15 engaged with the cam wheel 13 thereby varying the operating pressure onto the ball valve 17.

The present invention is to be practiced in the form as described above, and provides the following effects.

First, the variable pressure valve can be made small by separately providing the variable pressure valve and the control probe of controlling the same. It is possible to install only the variable pressure valve in a narrow site. An embodiment in which the variable pressure valve is installed in a human body is feasible.

Second, the use of an electromagnetic coil in feeding electric power to the variable pressure valve enables electromagnetic coupling, making it possible to supply power without directly contacting direct contact between the variable pressure valve and the control probe. Also, the variable pressure valve does not require a power supply to be mounted thereon, thereby making the replacement of a power supply unnecessary. Furthermore, the variable pressure valve can be remotely controlled by controlling the supply of power from the control probe.

Third, the variable pressure means if using an actuator using a shape memory alloy will not undergo magnetic disturbance from an outside.

Fourth, the variable pressure means if utilizing an actuator using a piezoelectric element will not undergo magnetic disturbance from an outside. Also, the absence of magnetic external disturbance prevents against malfunction.

Fifth, the provision of rectifying means for rectifying valve opening and closure can rectify valve opening and closure when the valve becomes unnecessarily open and closed in the course of usage. In such cases, the variable pressure valve does not have to be removed to correct unnecessary opening and closing. This is extremely effective where the variable pressure valve is set up at a site difficult to operate or where removal of the same makes it extremely difficult to keep a present state or require a long time to reassemble.

Sixth, the provision of an isolation structure for isolating a fluid flowing through the valve can isolate the actuator part to be supplied with power from the fluid flowing through the valve. This eliminates the possibility of depositing ingredients in the fluid on a power feeding part of the actuator, preventing malfunction due to deposition or electrical short circuit. Furthermore, the absence of effect of fluid ingredients enables a long term of use, enhancing reliability.

Seventh, the use of detecting means can easily align the control probe to the variable pressure valve. In particular, where the variable pressure valve is embedded, the control probe and the variable pressure valve are difficult to align. However, the use of detecting means facilitates the alignment. Also, such alignment makes possible to feed power due to electromagnetic coupling at a maximum efficiency. Effective power feed is feasible for the control probe and variable pressure valve if they are made separate.

Eighth, where using a shape memory alloy actuator, the affection of external disturbance on temperature can be reduced by setting an operating temperature such that a deformation temperature of the shape memory alloy is distant from an environmental temperature in normal use thereof.

Ninth, the use of an electrothermal element in a drive heat source to the shape memory alloy actuator can broaden a temperature range that the shape memory alloy is operative, coping with a fluid to flow through the valve in variety in kind.

What is claimed is:

1. A variable pressure valve apparatus comprising: a control probe having first electromagnetic means for generating electric power; a variable pressure valve independent from the control probe and having a fluid inlet port, a fluid discharge port, and a valve element for undergoing movement to close the fluid inlet port; control means for controlling movement of the valve element to close the fluid inlet port and comprised of a spring member for biasing the valve element to close the fluid inlet port, rotation means for undergoing rotation to deform the spring member and thereby vary a biasing force applied to the valve element by the spring member, movable means for undergoing movement to rotate the rotation means, and an ultrasonic motor having a piezoelectric element for undergoing extension movement to move the movable means to thereby rotate the rotation means to deform the spring member; and second electromagnetic means supplied with electric power generated by the first electromagnetic means for supplying electric power to the control means to control movement of the valve element to close the fluid inlet port.

2. A variable pressure valve apparatus according to claim 1; wherein the second electromagnetic means comprises a secondary electromagnetic coil for supplying electric power to the ultrasonic motor to extend the piezoelectric element.

3. A variable pressure valve apparatus according to claim 2; wherein the first electromagnetic means comprises a primary electromagnetic coil.

4. A variable pressure valve apparatus comprising: a control probe having first electromagnetic means for generating electric power; a variable pressure valve independent from the control probe and having a fluid inlet port, a fluid discharge port, and a valve element for undergoing movement to close the fluid inlet port; control means for controlling movement of the valve element to close the fluid inlet port and comprised of a spring member for biasing the valve element to close the fluid inlet port, rotation means for undergoing rotation to deform the spring member and thereby vary a biasing force applied to the valve element by the spring member, movable means for undergoing movement to rotate the rotation means, and a shape memory alloy spring for undergoing extension movement to move the movable means to thereby rotate the rotation means to deform the spring member; and second electromagnetic means supplied with electric power generated by the first electromagnetic means for supplying electric power to the control means to control movement of the valve element to close the fluid inlet port.

5. A variable pressure valve apparatus according to claim 4; wherein the second electromagnetic means comprises a secondary electromagnetic coil for supplying electric power to the shape memory alloy to extend the shape memory alloy.

6. A variable pressure valve apparatus according to claim 5; wherein the first electromagnetic means comprises a primary electromagnetic coil.

7. A variable pressure valve apparatus comprising: a case having a fluid inlet port and a fluid discharge port; a valve element for closing the fluid inlet port; a spring member disposed in the case and having a first end portion for contacting the valve element to bias the valve element to close the fluid inlet port and a second end portion; a cam wheel mounted in the case for undergoing rotation, the cam wheel having a first outer circumferential portion for contacting the second end portion of the spring member to deform the spring member to thereby vary a biasing force applied to the valve element by the spring member; a feed ratchet disposed in the case for undergoing movement to rotate the cam wheel; and moving means for undergoing extension movement to move the feed ratchet to thereby rotate the cam wheel to deform the spring member.

8. A variable pressure valve apparatus according to claim 7; wherein the moving means comprises a shape memory alloy.

9. A variable pressure valve apparatus according to claim 7; wherein the moving means comprises a piezoelectric element.

10. A variable pressure valve apparatus according to claim 7; further comprising a primary electromagnetic coil for generating electric power and a secondary electromagnetic coil supplied with electric power generated by the primary electromagnetic coil; wherein the secondary electromagnetic coil supplies electric power to the moving means to extend the moving means.

11. A variable pressure valve apparatus comprising: a case having a fluid inlet port and a fluid discharge port; a valve element for closing the fluid inlet port; a spring member disposed in the case and having a first end portion for contacting the valve element to bias the valve element to close the fluid inlet port and a second end portion; a cam wheel mounted in the case for undergoing rotation, the cam wheel having a first outer circumferential portion for contacting the second end portion of the spring member to deform the spring member to thereby vary a biasing force applied to the valve element by the spring member; and a regulating lever disposed in the case, the regulating lever having a first end portion for contacting a second outer circumferential portion of the cam wheel and a second end portion for applying a contact force on the valve element to close the fluid inlet port during rotation of the cam wheel.

12. A variable pressure valve apparatus comprising: a case having a fluid inlet port and a fluid discharge port; a valve element for closing the fluid inlet port; a cam wheel mounted in the case for undergoing rotation, the cam wheel having a first cam portion, a second cam portion and a third cam portion; movable means disposed in the case for undergoing movement to rotate the cam wheel; a jumper spring having an end portion for contacting the first cam portion of the cam wheel to regulate rotational movement of the cam wheel; a regulation lever having a first end portion for contacting the second cam portion of the cam wheel and a second end portion for applying a contact force on the valve element to close the fluid inlet port during rotation of the cam wheel; a spring member having a first end portion for contacting the third cam portion of the cam wheel and a second end portion for contacting the valve element so that during rotation of the cam wheel the spring element is deformed to bias the valve element to close the fluid inlet port; and moving means for undergoing extension movement to move the movable means to thereby rotate the cam wheel to deform the spring member.

13. A variable pressure valve apparatus according to claim 12; wherein the moving means comprises a shape memory alloy.

14. A variable pressure valve apparatus according to claim 12; wherein the moving means comprises a piezoelectric element.

15. A variable pressure valve apparatus according to claim 12; wherein the movable means comprises a feed ratchet disposed in the case for undergoing linear movement.

16. A variable pressure valve apparatus according to claim 15; wherein the moving means comprises a shape memory alloy.

17. A variable pressure valve apparatus according to claim 15; wherein the moving means comprises a piezoelectric element.

18. A variable pressure valve apparatus according to claim 12; further comprising a primary electromagnetic coil for generating electric power and a secondary electromagnetic coil supplied with electric power generated by the primary electromagnetic coil; wherein the secondary electromagnetic coil supplies electric power to the moving means to extend the moving means.

19. A variable pressure valve apparatus according to claim 18; wherein the moving means comprises a shape memory alloy.

20. A variable pressure valve apparatus according to claim 18; wherein the moving means comprises a piezoelectric element.

* * * * *